Figure 1:
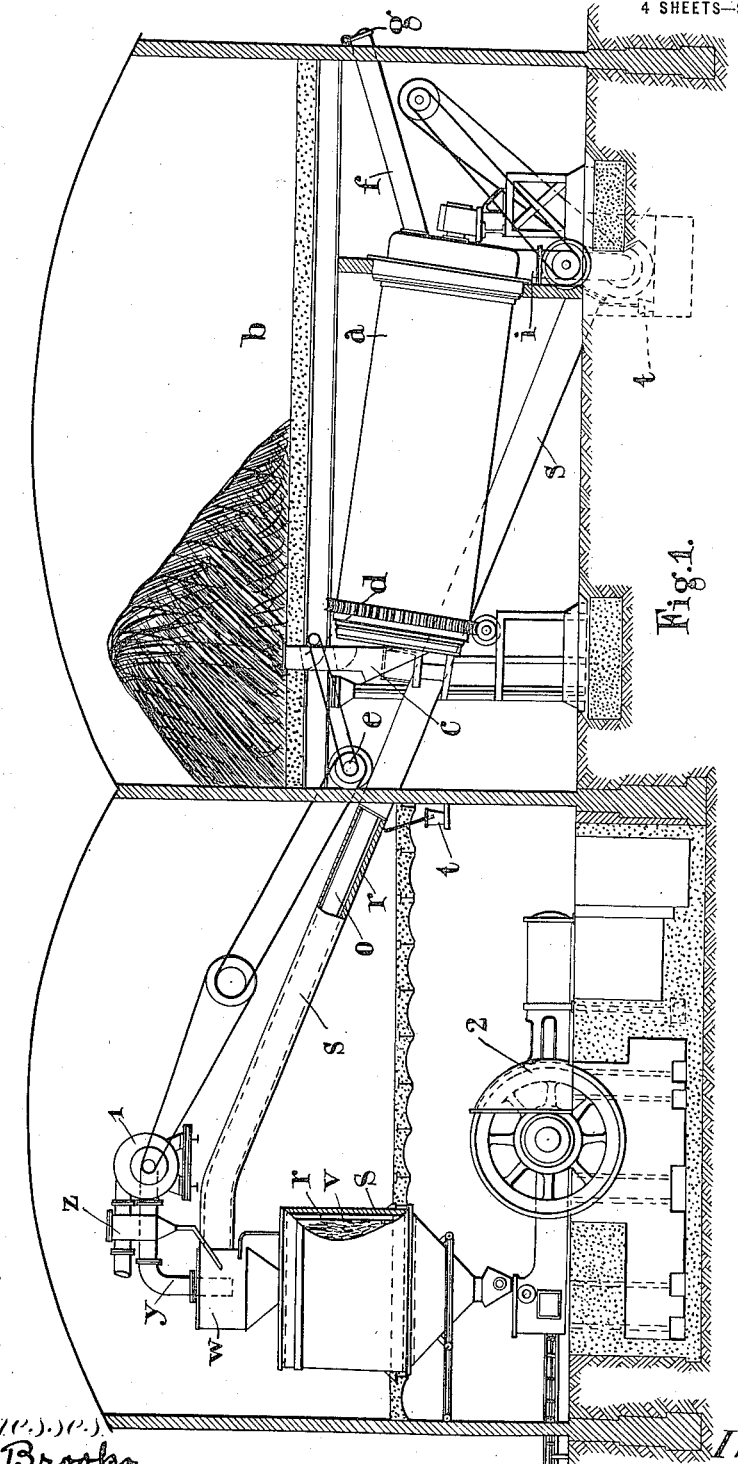

T. RIGBY.
FUEL BRIQUETING PLANT AND THE LIKE.
APPLICATION FILED FEB. 16, 1912.

1,208,658.

Patented Dec. 12, 1916.
4 SHEETS—SHEET 1.

Witnesses
Sidney Brooks
J. P. Davis

Inventor
Thomas Rigby
BY Munn & Co.
Attorney

T. RIGBY.
FUEL BRIQUETING PLANT AND THE LIKE.
APPLICATION FILED FEB. 16, 1912.

1,208,658.

Patented Dec. 12, 1916.
4 SHEETS—SHEET 3.

Witnesses
Sidney Brooks
J. P. Davis

Inventor:
Thomas Rigby
BY Munn & Co.
Attorney.

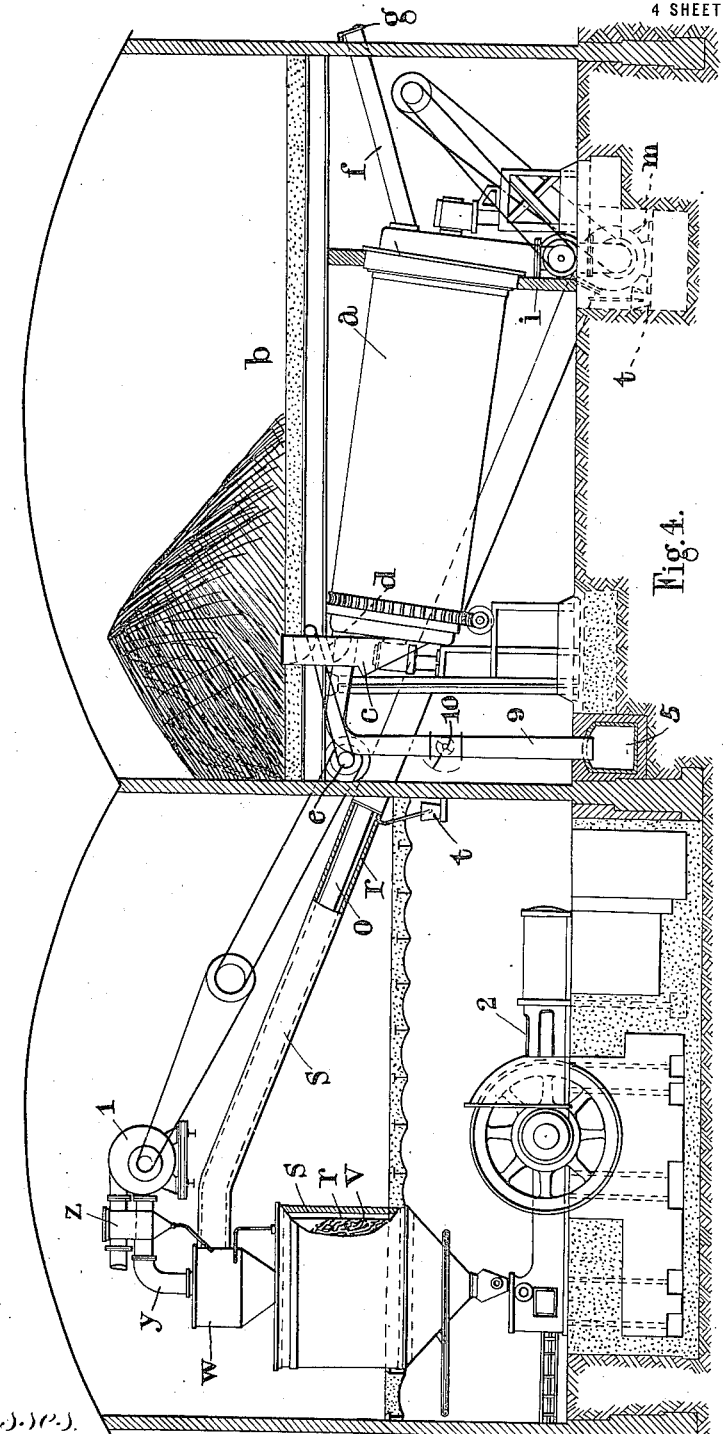

UNITED STATES PATENT OFFICE.

THOMAS RIGBY, OF DUMFRIES, SCOTLAND, ASSIGNOR, BY MESNE ASSIGNMENTS, TO WETCARBONIZING LIMITED, OF LONDON, ENGLAND.

FUEL-BRIQUETING PLANT AND THE LIKE.

1,208,658.   Specification of Letters Patent.   Patented Dec. 12, 1916.

Application filed February 16, 1912. Serial No. 677,923.

*To all whom it may concern:*

Be it known that I, THOMAS RIGBY, a subject of the King of Great Britain and Ireland, and residing at Station Hotel, Dumfries, Scotland, have invented certain new and useful Improvements in and Relating to Fuel-Briqueting Plants and the like, of which the following is a specification.

This invention relates to the drying, conveying and superheating of fuel in briqueting plants or similar installations and particularly to those installations in which fuel containing a substantial percentage of water is dried prior to briqueting.

It has been found in practice that the material (which is usually dried in the type of drier known as the "Schultze" drier) is highly inflammable when dry, and it is therefore necessary to take precautions to avoid explosion. This is particularly the case when treating lignite or brown coal and in a lesser degree when treating peat. In such processes it is usual to disintegrate the fuel in the first place while still moist, e. g. containing 50 to 60 per cent. by weight of water, and the disintegrated material is then passed through driers as indicated. The material is usually dried by external heating of the apparatus and air is passed through the driers and carries away the water vapor given off by the fuel. The saturated air then passes to waste, the disintegrated dry material falling into a conveyer or the like generally of the spiral kind whereby it is taken to a briqueting press. The temperature of the saturated mixture of air and vapor is usually about 80° C. in lignite factories, but in this mixture combustion of the disintegrated fuel can occur. One object of the present invention is to overcome the danger of ignition; a further object being to prevent the escape of dust from the apparatus, which is a source of danger as it collects on the walls and in crevices in the factory building.

A further object is to effect heat economy in a process of the character indicated.

This invention consists in effecting the drying of the disintegrated material in an atmosphere incapable of allowing ignition, for example by reducing very considerably the air allowed to enter the driers to mix with the disintegrated dusty substance and producing thereby a very wet atmosphere, or by employing other inert gases such as flue gases entirely or partially to replace the air.

This invention further consists in conveying the material to the briqueting press or other locality in an atmosphere of the character referred to, e. g. a mixture of water vapor and air or flue gases as above referred to and preferably obtained from the drying apparatus may be employed or the material may be conveyed in an atmosphere of products of combustion alone.

This invention also consists in effecting final drying of the material or superheating of the same or both by the use of hot products of combustion whereby these operations can be economically and safely carried out.

This invention also consists in the combination with a drier such as a Schultze drier of a suitable duct, exhauster and dust separator, so that material from the drier can be conveyed to the press or other locality in an atmosphere of the character indicated without escape of dust.

This invention also consists in the improved methods and apparatus for drying, conveying or superheating materials of the nature referred to or for effecting any combination of such operations hereinafter described.

The accompanying diagrammatic drawings show three examples of installations according to this invention for the production of briquets of wet carbonized peat.

Figure 2:
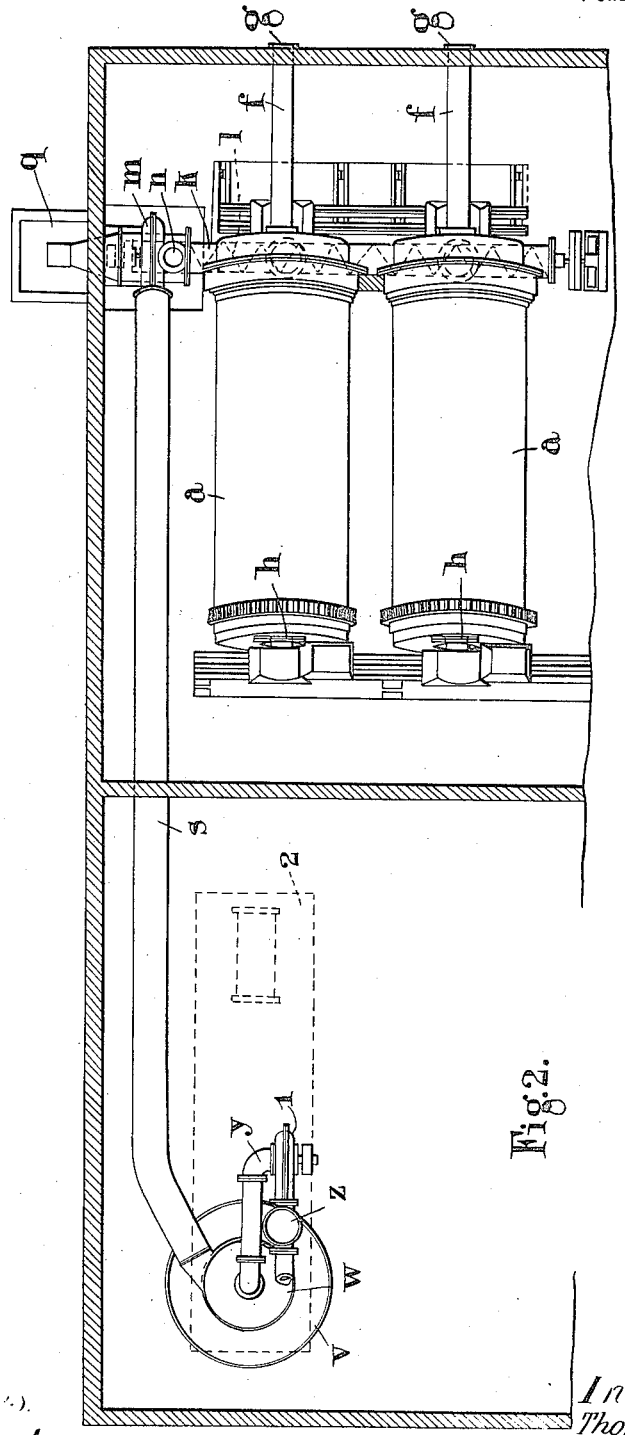
Figure 3:
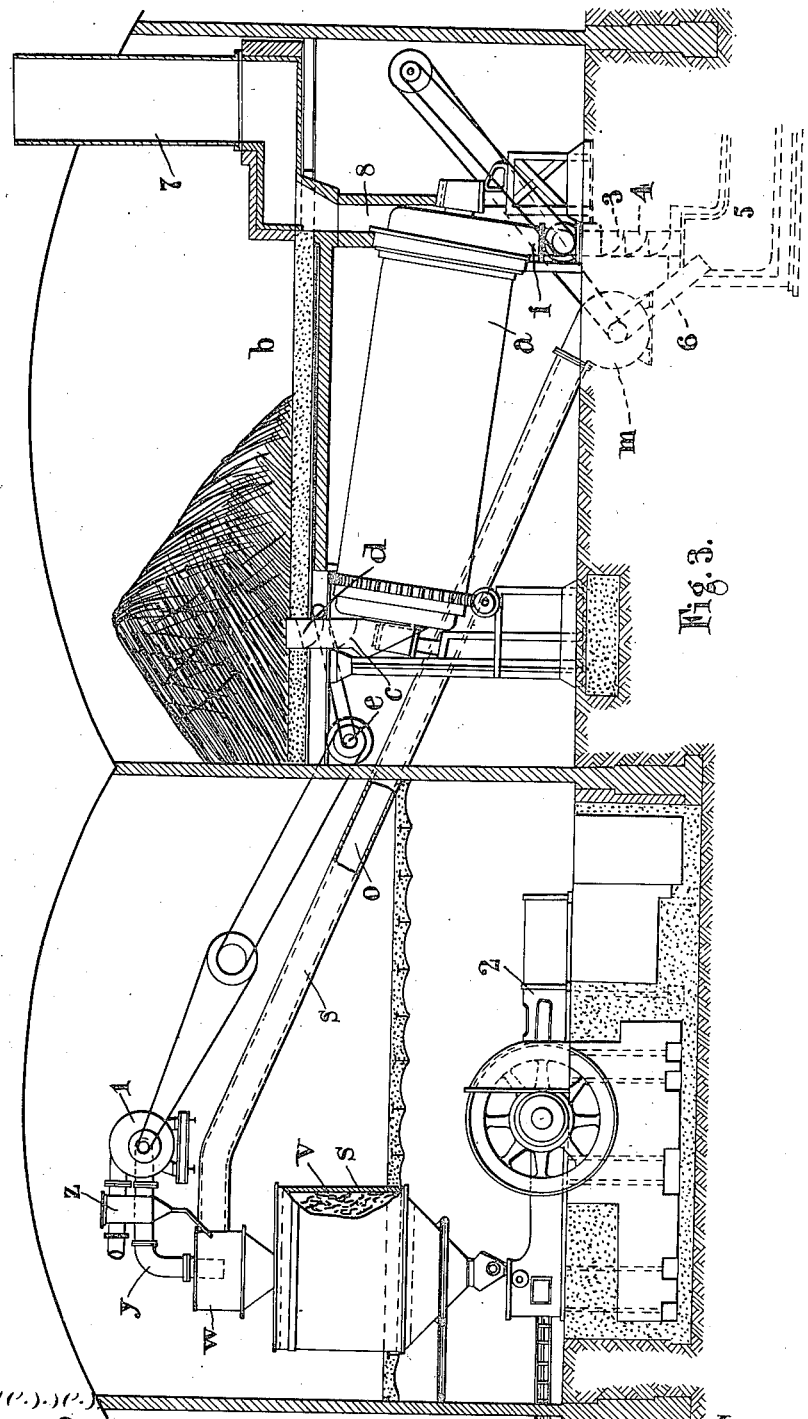

Figures 1 and 2 show respectively in part sectional elevation and in part sectional plan an installation in which the material is conveyed by a very humid air current. Fig. 3 shows in part sectional elevation a form in which conveyance is effected by products of combustion from some suitable source; and Fig. 4 shows a form of the installation shown in Figs. 1 and 2 in which products of combustion are passed through the drier itself.

Referring to Figs. 1 and 2, $a$ $a$ are rotary driers on the Schultze type, in which a shell $a'$ rotatable by means of the toothed ring $a^2$ between the two end pieces $a^3$, $a^4$, carries by means of end tube plates, a plurality of tubular conduits $a^5$ through which the material to be dried in association with some air or other gaseous mixture admitted at the end of piece $a^3$, passes, due to the tumbling motion resulting from the rotation of the shell and in which heat is imparted to the material by steam occupying space between the exterior of the tubes and the exterior of the shell, the driers are supplied with material from the store floor $b$, by chutes, $c$, in which are provided distributers, $d$, operated by belting from the shaft $e$. The driers are provided with safety relief tubes $f$, with suitable weighted doors, $g$, and are at their inlet ends either practically totally inclosed to prevent ingress of more than a little air, or are provided with means for closing the inlets to a regulated extent to limit the amount of air entering as desired. At the same time, it is desirable to provide a mica window $h$ in the end cover of each drier to allow of inspecting the tubes as the drier rotates to ascertain that all are free from stoppages. The outlets $i$ of the driers depend into a closed trough $k$ in which is a screw conveyer $l$ which feeds the material to the intake of a fan $m$. A duct, $n$, is provided to lead steam or moist air in any desired amount to the intake of the fan. The fan gathers up the light dusty powder and conveys it through the duct $o$, leaving behind all stony matters which are separated out by a stone separator, and pass into a pit $q$. The duct $o$ is surrounded by a steam jacket $r$, into which steam say at $2\frac{1}{2}$ atmospheres pressure is passed to prevent condensation from the humid current passing through the duct, and this jacket is provided with abundant lagging $s$. Steam traps $t$ are provided in connection with the jacket. The duct $o$ opens into a cyclone $w$ situate above and opening into the bunker $v$. The gas duct $y$ from the cyclone passes to a fan 1, which through a dust separator $z$ is connected to the gas outlet of the installation. The bunker $v$ is jacketed and lagged like the duct $o$, and feeds the material as and when desired and after any necessary superheating into an open die briquet press 2.

The installation is operated as follows:— The material which passes through the heated driers $a$ is dried therein, and by allowing little or no air to pass through the drier the atmosphere in contact with the material can be caused to become so humid therein that no possibility of ignition can arise. The material still in such an atmosphere is by the conveyer $l$ brought to the intake of the fan $m$, where the light dusty particles are drawn by the velocity of the gas current through the duct $o$ into the cyclone, the heavier stony matters remaining behind and passing out to the pit $q$. In the cyclone $w$ the solid matters are precipitated and fall into the bunker $v$, while the mixed air and water vapor after passing through the separator $z$ are sucked out by the fan 1 and passed out to any suitable spot and preferably to the grate of the ammonia recovery producer where such is used in the plant to utilize the larger amount of water vapor therein contained. The material which has fallen into the bunker is in the usual way superheated and supplied to the briqueting press 2.

Referring to Fig. 3, the same shows an installation of the nature of that last described, but in which products of combustion from any suitable furnace are supplied to the fan $m$ to convey the material. In this case the dried material which is collected from the driers is passed by the conveyer to a tube 3 in which is a distributing arrangement 4, which delivers the material into a closed ended flue 5, into which the flue gases are introduced and into which the intake 6 of the fan $m$ opens. Steam jacketing around the duct $o$ and bunker $v$ may in this case be dispensed with.

In Fig. 4 is shown an installation of the nature of that described in connection with Figs. 1 and 2, modified so that a certain volume of flue gases can be passed through the drier itself. For this purpose a pipe 9 connects the flue 5 to the end cover of the drier $a$, while an adjustable damper 10 permits controlling the amount of the gases so admitted. So much steam or humid air as may be necessary can be admitted to the intake of the fan as referred to in connection with the installation shown in Figs. 1 and 2, and such a method is of particular advantage in connection with the briqueting of lignite, which is particularly dangerous.

In an arrangement as shown in Fig. 4, and operated as indicated, at no stage is there a sufficiency of oxygen present in the atmosphere in contact with the material to lead to any risk of ignition.

It will be understood that the material may be transmitted by suction through the driers, a suitable exhauster or equivalent arrangement being applied to the gas outlet of the cyclone or other separator for this purpose.

The speed of the gaseous atmosphere in the duct from the drier must in all cases be sufficient to carry forward the dry material, and the velocity should be varied therefore according to the specific gravity and nature of the dry material.

When using systems as indicated in Figs. 1–3, it is desirable in every case to admit a limited quantity of air into the driers, as the difficulty of avoiding condensation is thereby considerably reduced.

Hitherto difficulties have arisen in the effective separation of the light dust from the gases leaving the drier, but by reducing according to the present invention the amount of air in the mixture which leaves the drier, the specific gravity of the mixture is reduced and the difference between the specific gravity of the mixture and of the dust is thereby increased, and separation by a cyclone or other device is rendered easier.

When working with lignite or brown coal it is in some cases necessary to reduce the temperature of the dust to the neighborhood of between 30° and 40° C., before briqueting, which may be effected in any suitable manner.

Although the substance leaving the driers has been referred to as dried material, it will be understood that the actual water content may vary considerably, being with some fuels as much as 15 per cent., while with peat only a very small percentage, e. g., 2 or 3 per cent., may be contained in the material when it leaves the driers.

It will be understood that the higher the saturation temperature which can be employed for the air and vapor mixture, where such is the mixture employed, the more remote is the possibility of ignition and the higher the temperature which the material can be caused to have when it is separated from the stream of mixed air and steam. When working with peat, a saturation temperature for the mixture in the neighborhood of 95° C. (corresponding to about 10 per cent. by volume of air) would give one mixture which was suitable for the present purpose.

When using products of combustion, the latter may act to effect superheating of the material, and thus allow of direct delivery of it to the press, or of the formation of a store of superheated material ready for immediate briqueting. At the same time, the temperature of the gases employed must not be such that there is any likelihood of the formation of combustible substances, for example, carbon monoxid.

By utilizing for the heating products of combustion which are composed practically wholly of inert gases the danger of explosion during the process is reduced to a minimum, and as these gases are usually waste products, by utilizing the same economy in the heat supplied is obtained. By effecting drying and heating by a gaseous heating medium which comes into direct and intimate contact with the particles of the substance, a relatively far greater efficiency is obtained than where the material is heated in bulk from external sources.

Although the methods described with reference to Figs. 3 and 4 present advantages with respect to effecting superheating while conveying the material, and economy due to the flue gases being waste products, the method indicated with respect to Figs. 1 and 2 is to be preferred, as it involves a lesser alteration of existing installations, and the waste gases (humid air) can be utilized in the manner previously indicated.

It will be seen that by operating according to the present invention, dangerous dust in the factory can also be almost entirely obviated, while at the same time if any tendency is observed for air to leak into the apparatus, the steam pressure may be adjusted so as to overcome the same.

It will be understood that the present invention may be carried into effect in many different ways, and that the methods above described are referred to by way of example only.

Having thus described my invention what I claim as new and desire to secure by Letters Patent is:—

1. The method of reducing the liability of fire in a briqueting installation in which an inflammable powder, for the purpose of removing moisture therefrom, is normally passed through a drying apparatus in association with a gaseous mixture having constituents tending to support combustion, such method consisting in reducing such constituents beyond the point at which inflammation can be propagated through the associated mass.

2. In a briqueting installation in combination, a drier, means for supplying a limited quantity only of gas to said drier to assist the removal of moisture from powdered peat undergoing desiccation, an element for separating solids from gases, a duct connecting the locality at which the drier is situated to said element, a duct connecting the outlet of the drier to the former duct, and means for causing a rapid stream of non-inflammable flue gases to flow through the former duct, as set forth.

In testimony whereof I have signed my name to this specification in the presence of two subscribing witnesses.

T. RIGBY.

Witnesses:
James W. Green,
Bertram H. Matthews.